United States Patent [19]
Araki et al.

[11] Patent Number: 5,245,740
[45] Date of Patent: Sep. 21, 1993

[54] METHOD AND APPARATUS FOR PASSING THREADLIKE PIECES THROUGH TUBULAR PRODUCTS

[75] Inventors: Nobuo Araki; Kazufumi Tabata; Kiyomi Yokoi; Tadami Ashidate; Osamu Hattori, all of Tokyo, Japan

[73] Assignee: Nippon Steel Welding Products & Engineering Co., Ltd., Tokyo, Japan

[21] Appl. No.: 914,022

[22] Filed: Jul. 15, 1992

Related U.S. Application Data

[60] Continuation of Ser. No. 552,396, Jun. 5, 1990, abandoned, which is a division of Ser. No. 334,205, Mar. 24, 1989, Pat. No. 5,058,259.

[30] Foreign Application Priority Data

| Mar. 25, 1988 | [JP] | Japan | 63-69752 |
| Mar. 25, 1988 | [JP] | Japan | 63-69753 |
| Mar. 25, 1988 | [JP] | Japan | 63-69754 |
| Mar. 31, 1988 | [JP] | Japan | 63-76486 |
| Jan. 23, 1989 | [JP] | Japan | 63-11837 |
| Feb. 9, 1989 | [JP] | Japan | 1-28704 |

[51] Int. Cl.$^5$ .............................................. B23P 19/04
[52] U.S. Cl. .................................... 29/433; 29/241; 254/134.3 FT
[58] Field of Search ............... 29/241, 433, 709, 728, 29/819, 821; 254/134.3 FT; 350/96.23

[56] References Cited

U.S. PATENT DOCUMENTS

| 4,793,048 | 12/1988 | Kashwaya et al. | 29/433 |
| 4,802,270 | 2/1989 | Kashiwaya et al. | 29/433 X |
| 4,887,354 | 12/1989 | Vand Der Maaden | 29/433 X |

FOREIGN PATENT DOCUMENTS

| 0091717 | 10/1983 | European Pat. Off. |
| 0152720 | 8/1985 | European Pat. Off. |

Primary Examiner—Mark Rosenbaum
Assistant Examiner—Frances Chin
Attorney, Agent, or Firm—Wenderoth Lind & Ponack

[57] ABSTRACT

A coil of a tube is formed. The coil is vibrated while a threadlike piece is passed in through the inlet end of the tube so that a given point of the tube reciprocates along a helical path. Provision is made to ensure that inlet end of the tube does not cause a portion of the threadlike piece upstream of and close to that inlet end to move diametrically while being fed into the tube. Provision is also made to form a coil of the threadlike piece, from which the threadlike piece is pull out along the axis of the coil and fed to the inlet end of the tube by a conveying force resulting from the vibration of the coil of the tube. A feeder to supply the threadlike piece into the tube may be provided between the inlet end of the tube and a coil feeding device.

4 Claims, 10 Drawing Sheets

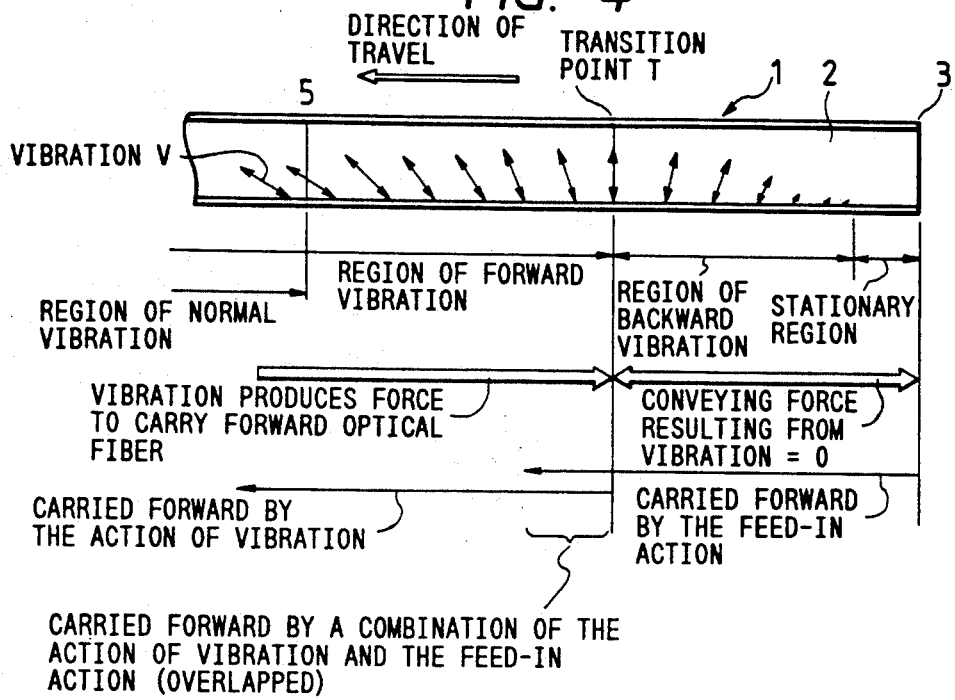
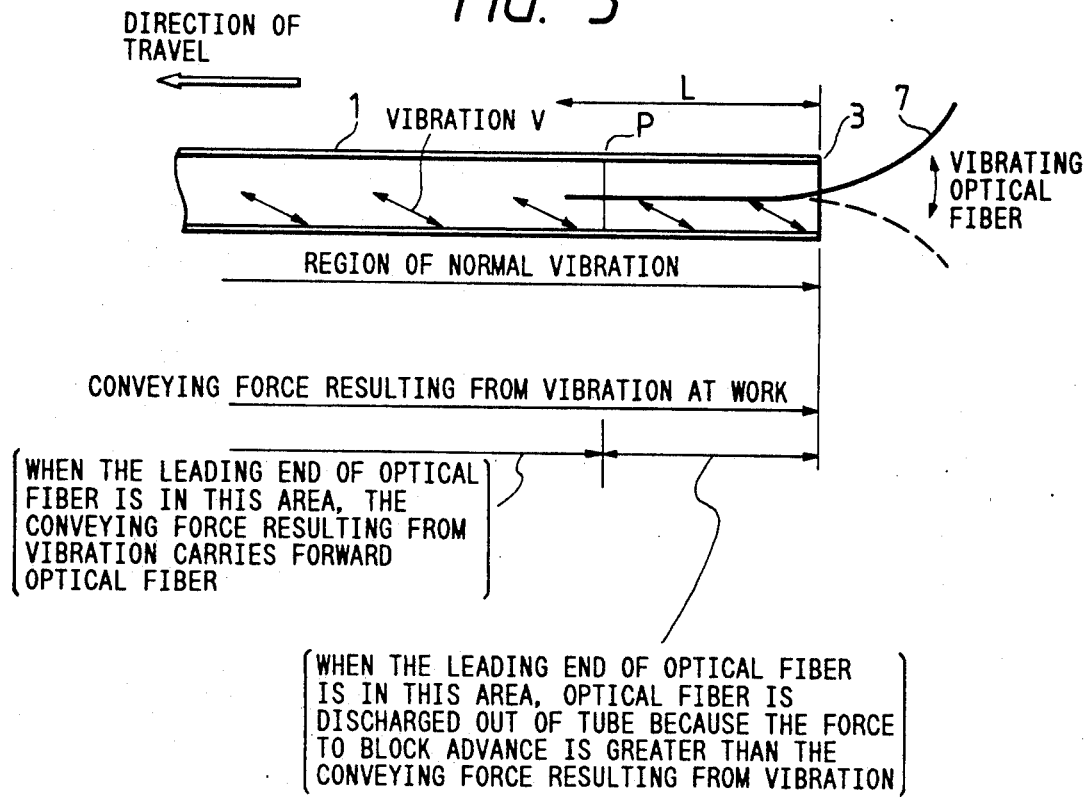

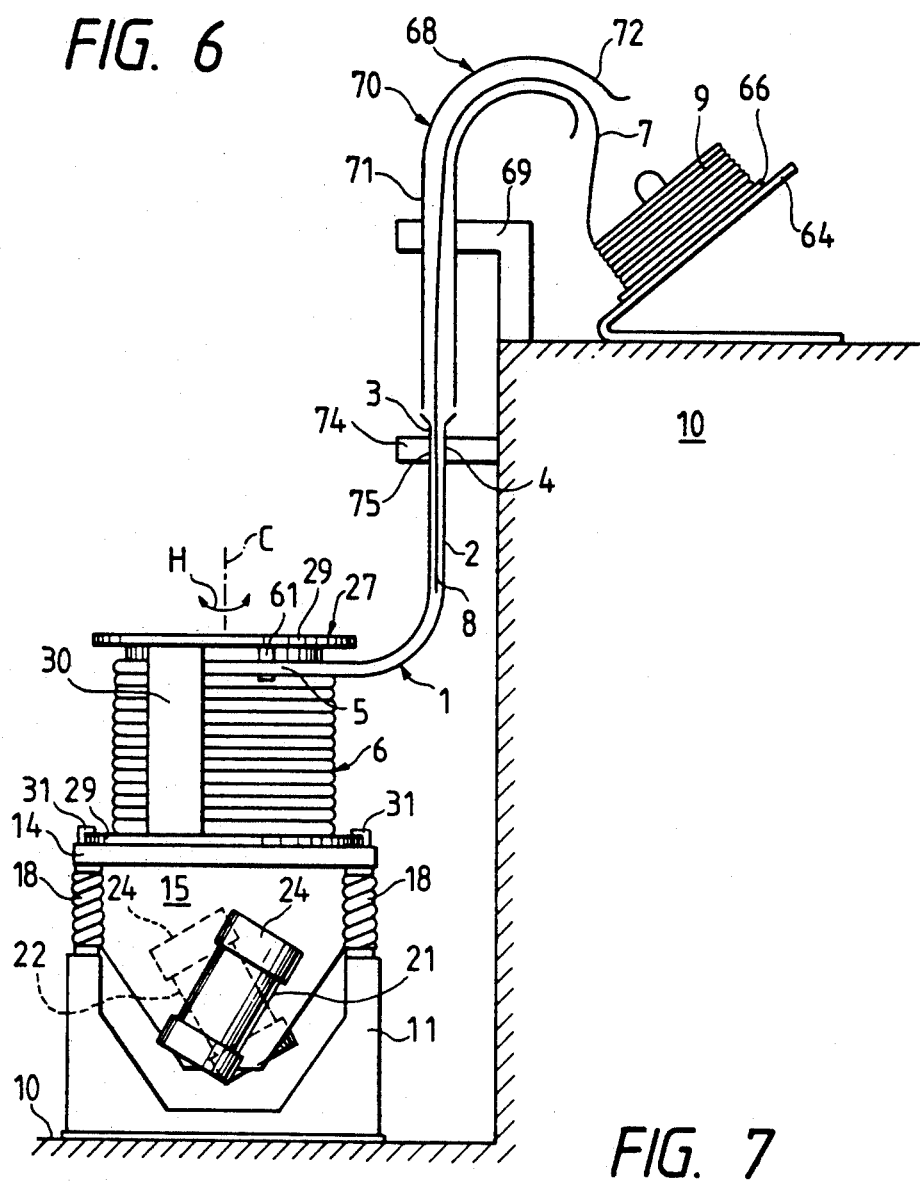
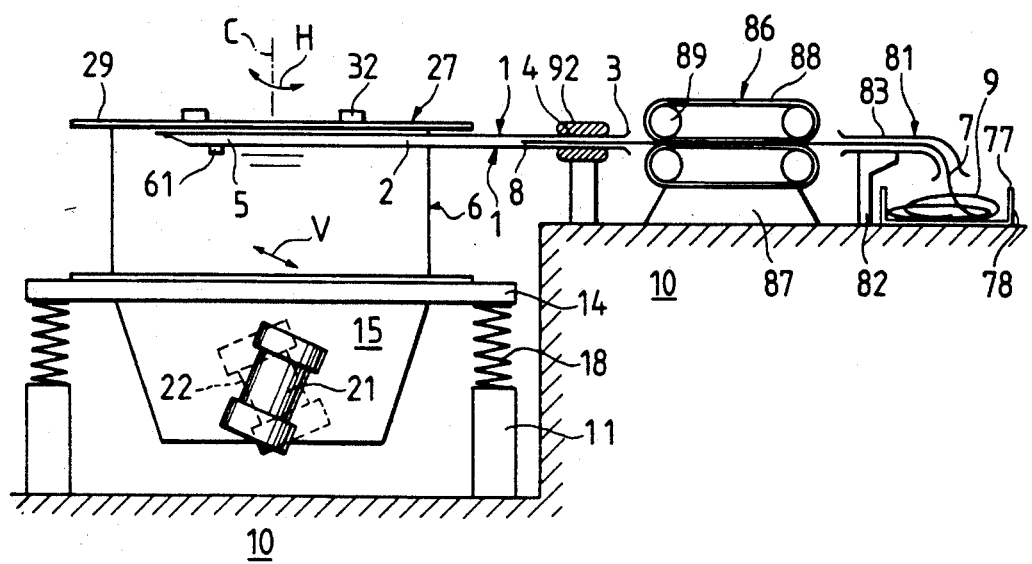

FIG. 8
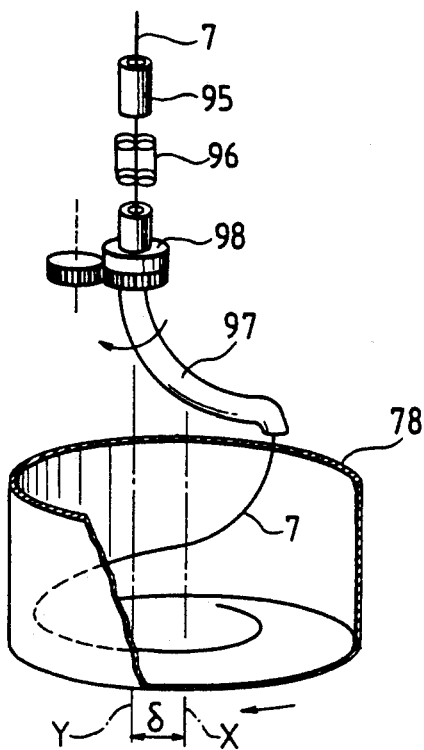
FIG. 9(a)
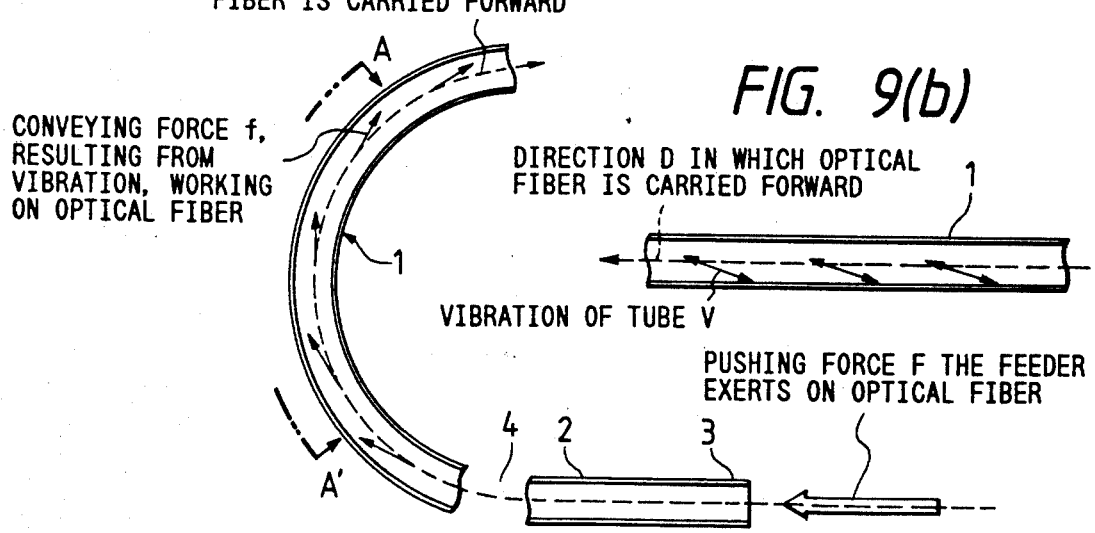
FIG. 9(b)

METHOD AND APPARATUS FOR PASSING THREADLIKE PIECES THROUGH TUBULAR PRODUCTS

This application is a Rule 1.62 continuation of now abandoned application, Ser. No. 07/552,396, filed Jun. 5, 1990, which in turn is a Rule 1.60 division of Ser. No. 07/334,205, filed Mar. 24, 1989, now U.S. Pat. No. 5,058,259.

BACKGROUND OF THE INVENTION

1. Field of the Invention

This invention relates to a method of passing threadlike piece through a tubular product, and more particularly to a method and apparatus for passing threadlike pieces through tubular products by vibration.

The method and apparatus of this invention is used for making optical fiber cables, electric cables, composite conduits and the like comprising optical fibers, metal wires and other threadlike pieces passed through protective tubes or sheaths.

2. Description of the Prior Art

Threadlike pieces are often passed through long tubular products. Optical fiber cables recently coming into extensive use, for example, are often metal-covered to make up for the insufficient strength of optical fibers. In such instances, core wires or cords of optical fibers are passed through tubes not more than a few millimeters in diameter and over several hundred meters in length. Sometimes, a messenger wire of steel or other metal is passed before a core wire or cord is passed.

Typical conventional methods of making such products comprising threadlike pieces passed through metal and other tubes are disclosed in EPC Patent No. 91717 and Japanese Provisional Patent Publication No. 44010 of 1987. In these methods, carrier members or tubes (hereinafter generically called tubes) through which threadlike pieces are passed are vibrated. A threadlike piece is passed through a tube by means of the carrying force imparted thereto on the "vibrating conveyor". When a tube is as long as, for example, over tens of meters, the tube is coiled for ease of handling, and a threadlike piece is passed through the coiled tube.

A threadlike piece passed through a long tube according to such conventional methods often stops part way through. The threadlike piece once stopped remains at a standstill even if the vibration of the tube continues. On the occurrence of such a blockage, the entire length of the inserted threadlike piece or a considerably large portion thereof has had to be pulled out of the tube for starting the job all over again. As such, conventional methods of passing threadlike pieces through long tubes have been inefficient and time-consuming. The following is the cause for the stopping of a threadlike piece part of the way through a tube the inventors have found.

In the conventional methods, the inlet end of a tube vibrates integrally with a coil. The vibrating inlet end coming in contact with a threadlike piece exerts a force thereon that works in the direction of the diameter of the tube. Therefore, a portion of the threadlike piece upstream of and close to the inlet end of the tube moves vigorously in that direction. As a consequence, a centrifugal force flicks the portion of the threadlike piece near the inlet end out of the tube, thereby obstructing the further advance of the threadlike piece into the tube. Also, the rapid diametrical motion of the inlet end causes the same portion to remain ahead of the inlet end, thereby discharging the threadlike piece in the tube. Furthermore, the vibration repeatedly bends and damages the threadlike piece near the inlet end of the tube. Microcracks are a typical damage to optical fibers, in particular. The vibration-induced contact with the inlet end of the tube can produce an abrasion on the surface of the threadlike piece.

Usually, a threadlike piece paid off from a spool or bobbin is fed to a tube into which the piece is to be passed. If the pay-off (or the feed) of the threadlike piece from the spool etc. lags, for some reason, behind the travel forward by vibration, the threadlike piece is pulled backward, no longer advancing into the tube.

A threadlike piece winds forwards with undulating motion through a tube. The advance of the forward end of the threadlike piece lags behind that of the following portion or stops when the forward end trips against irregularities on the inner surface of the tube or foreign matters therein, or when it is subjected to a backward force from near the top surface of the inner wall. Pushed by the following portion, the forward end of the threadlike piece on such occasions suddenly makes heavy undulations. Consequently, peaks of such undulations in the forward end of the threadlike piece strike hard against the inner wall of the tube, offering sufficient resistance to suddenly prevent the further passing of the threadlike piece therethrough.

The part way stalling of a threadlike piece in a tube is due to any one of or a combination of the three causes just described.

SUMMARY OF THE INVENTION

The object of this invention is to provide a method and apparatus for efficiently passing a threadlike piece through a tube without damaging the threadlike piece.

A method of passing a threadlike piece through a tube according to this invention comprises forming a coil of tube and vibrating the coil of tube while feeding a threadlike piece from an inlet end of the tube so that a given point of the tube reciprocates along a helical path. The threadlike piece is fed in such a manner that the inlet end of the tube does not impart a diametrical motion to a portion of the threadlike piece upstream of and close to the inlet end.

The threadlike piece may instead be pulled out and fed from a coil thereof along the axis of the coil by use of a carrying force resulting from vibration that works on the threadlike piece in the tube. Also, the feed rate of the threadlike piece may be adjusted at a point upstream of the inlet end of the tube so that the feed rate of the threadlike piece determines the passing rate thereof.

A coil of tube is made by winding a tube around a cylindrical core such as a bobbin or a spool. A tube may instead be formed into a core-less coil. To facilitate passing and avoid the imposition of excessive bending stress of the threadlike piece, a coil of tube should preferably have a diameter of not smaller than 150 mm.

A threadlike piece is fed from a spool on which the thread is wound, or a bobbin at a standstill, or a container holding a coil thereof. The spool may be rotated to permit a positive feed of a threadlike piece therefrom at a speed equivalent to that of conveyance owing to vibration. The feed rate of the threadlike piece, which determines the speed of the threadlike piece passed by vibration, is either faster or slower than the passing rate thereof. A feeder provided between the spool or the like and the inlet end of a tube controls the feed rate of a threadlike piece so that the feed rate determines the passing rate thereof. When a driven spool is used, the feed rate of a threadlike piece is adjusted by controlling the rotating speed of the spool. The feed rate may also be controlled by means of the friction between a threadlike piece and a guide to provide a support thereto that is provided upstream of the inlet end of a tube. For instance, the feed rate is decreased by increasing the friction therebetween. When the rotating speed of a spool is controlled and the friction of a guide is used, the feed rate of a threadlike piece cannot be made faster than the rate of conveyance by vibration. A threadlike piece may be sent to the inlet end of a tube by means of a feeder either only during the early stage of passing or continuously throughout the entire period of passing. In the latter case, the feeder pushes a threadlike piece into a tube through the inlet end thereof, passing the threadlike piece therethrough at a speed equal to the feed rate of the feeder. Using a feeder, the feed rate of a threadlike piece may also be kept below the speed of conveyance by vibration.

A coil of tube, which is either core-less or wound around a cylindrical core, can be vibrated by oscillating a member that holds or supports the coil by such known devices as a vibrating motor or an electromagnetic vibrator. The angle of vibration (i.e., the lead angle of the helix), the frequency of vibration and the total amplitude of vibration in terms of vertical component are preferably between 5 degrees and 30 degrees, between 10 Hz and 30 Hz, and between 0.2 mm and 2.0 mm, respectively. An ultrasonic oscillator may be used, too.

To ensure that the inlet end of a tube does not diametrically move a portion of a threadlike piece upstream of and close to the inlet end, the inlet end of the tube is immovably fastened to the floor or suitable structure or device therearound. Also, the inlet end of a tube may be held in such a manner as to allow the longitudinal motion of the tube while restraining the diametrical motion thereof. Otherwise, a guide that extends substantially horizontally and opening upward may be connected to the inlet end of a tube so that the guide vibrates integrally with a coil of the tube. A threadlike piece passed into the guide from above through the opening at the top is then led to the inlet end of the tube.

An apparatus for passing a threadlike piece through a tube according to this invention comprises a cylindrical member around which a tube through which a threadlike piece is to be passed is wound to form a coil thereof, a device to hold the inlet end of the tube so that the inlet end thereof does not diametrically move a portion of the threadlike piece upstream of and close to the inlet end of the tube, a device to vibrate the cylindrical member so that a given point of the tube reciprocates along a helical path, and a device to feed the threadlike piece into the coil of tube being vibrated from one end thereof.

In the apparatus just described, the device to hold the inlet end of a tube may be eliminated. Then, the threadlike piece feeding device holds a coil of a threadlike piece and feeds a threadlike piece, which is pulled out along the axis of the coil thereof by the vibration-induced carrying force acting on the threadlike piece in the tube, to the inlet end of a tube. The threadlike piece feeding device may be of such design as to control the feed rate of a threadlike piece at a point upstream of the inlet end of a tube so that the feed rate of the threadlike piece determines the passing rate thereof. Furthermore, the inlet end holding device and any of the threadlike piece holding devices just described may be combined into a single integral unit.

When a coil of tube is vibrated by the method and apparatus of this invention just described so that a given point of the tube reciprocates along a helical path, the inner wall of the tube exerts on the threadlike piece in the coiled tube a force that works in a diagonally forward and upward direction. Therefore, this force causes the threadlike piece in the tube to jump or slide along the inner wall of the tube in a diagonally forward and upward direction. Thus, the inner wall of the tube intermittently exerts a carrying force, which works in the direction of the circumference of the coil, on the threadlike piece in the tube to cause the threadlike piece to advance therethrough.

When the inlet end of the tube is firmly held, no centrifugal force works on the threadlike piece near the inlet end. Therefore, the threadlike piece does not jump out of the tube. Prevented from making a sudden diametrical motion, in addition, the threadlike piece near the inlet end is neither caused to remain ahead of the inlet end nor to be damaged.

When a threadlike piece to be fed to the tube is pulled out from a coil thereof along the axis of the coil, there is no need to rotate a spool and the coil wound therearound. Only a small amount of force is required for pulling out the threadlike piece from the coil. Therefore, the carrying force produced by vibration is enough for feeding the threadlike piece to the inlet end of the tube. The force to pull out the threadlike piece from the coil is not only small as mentioned above but also substantially constant. Such a force assures a stable feed of the threadlike piece to the inlet end of the tube, reducing the risk of the threadlike piece being passed stopping part way through the tube.

When the feed rate of a threadlike piece determining the passing speed of the threadlike piece is faster than the speed of the threadlike piece passed forward by vibration, the threadlike piece is forced into the tube through the inlet end thereof. Vibration not only generates a carrying force, but also facilitates the insertion of the threadlike piece by reducing the friction between the threadlike piece and the inner surface of the tube. The force needed for the forcible insertion must be great enough to overcome the frictional resistance the inner surface of the tube offers to the threadlike piece travelling therethrough and, at the same time, small enough not to break the threadlike piece. A proper amount of pushing force permits the threadlike piece to be passed forward at a higher speed than the speed attained with the conveyance by vibration alone. Pushing with such a force is also an effective way to overpower the frictional resistance offered by the inner surface of the tube. Conceivably, on the other hand, frictional resistance increases with an increase in the length of a threadlike piece passing through a tube. Therefore, effectiveness of forcing in the threadlike piece disappears beyond a certain point. As such, the choice of a proper pushing force and speed requires careful considerations to such points. Generally, the risk of stopping part way through is smaller with the forced-in threadlike piece. Because of the aforementioned limit in applicable length, however, this method is suited only for tubes not longer than several hundred meters. When, on the other hand, the feed rate of a threadlike piece is slower than the speed of the threadlike piece, the threadlike piece in the tube is pulled backward. This backward pulling reduces the undulation of the threadlike piece in the tube. The lessened undulation, in turn, decreases or eliminates the friction between the inner surface of the tube and the leading end of the threadlike piece at the peak of undulation. This substantially completely eliminates the risk of part way stopping.

The method and apparatus of this invention assures efficient passing of a threadlike piece through a tube without causing degeneration and damage, even if the tube diameter is small (e.g., 2 mm or under in outside diameter) and the tube length is large (e.g., 1 km or over in overall length).

BRIEF DESCRIPTION OF THE DRAWINGS

FIGS. 4 and 5 illustrate how an optical fiber is carried forward at the inlet end of a tube. FIG. 4 shows a case according to this invention, whereas FIG. 5 a case with a conventional method;

FIG. 6 is a side elevation showing a second preferred embodiment of an optical fiber passing apparatus according to this invention;

FIG. 7 is side elevation showing a third preferred embodiment of an optical fiber passing apparatus according to this invention;

FIG. 8 is a perspective view illustrating a method of forming a coil of optical fiber;

FIGS. 9(a) and 9(b) illustrate how an optical fiber is carried forward at the inlet end of a tube;

DESCRIPTION OF THE PREFERRED EMBODIMENTS

In all preferred embodiments of this invention to be described hereunder, an optical fiber is passed through a steel tube.

Preferred Embodiment I

Figure 1:
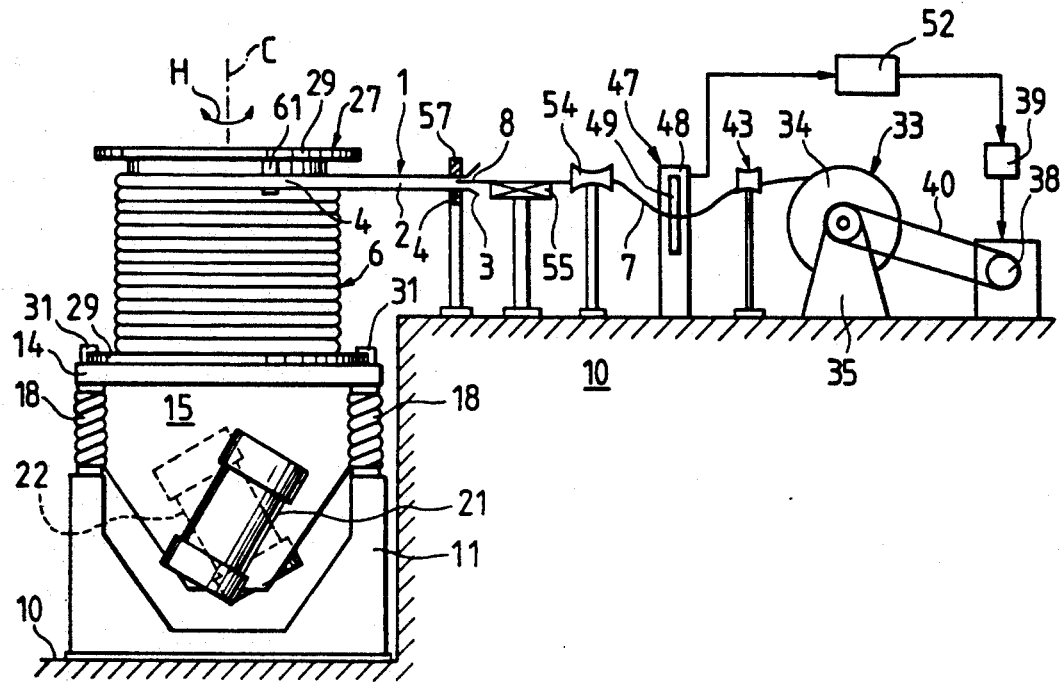
FIG. 1 is a side elevation showing a first preferred embodiment of an optical fiber passing apparatus according to this invention.
Figure 2:
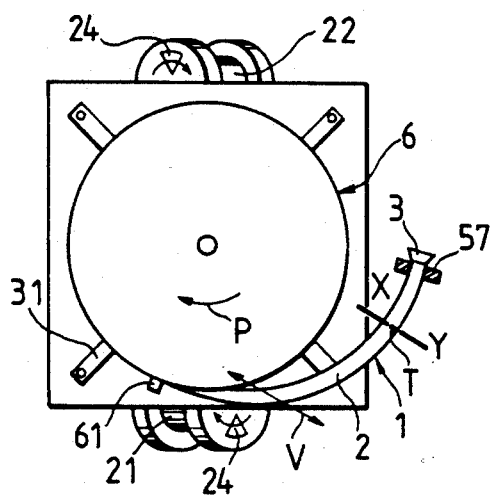
FIG. 2 is a plan view of a vibrating table of the same apparatus.

A preferred embodiment of an apparatus to implement a passing method of this invention will be described first. FIG. 1 is an overall view of a passing apparatus according to this invention, and FIG. 2 is a plan view of a vibrating table on the same apparatus.

A base 11 is firmly fastened to the floor 10 so as not to vibrate. Coil springs 18 to support a vibrating table are mounted at the four corners of the top surface of the base 11.

A flat square vibrating table 14 is placed on the base 11, with the support springs 18 interposed therebetween. A support frame 15 extends downward from the bottom surface of the vibrating table 14.

The support frame 15 under the vibrating table 14 carries a pair of vibrating motors 21, 22. The vibrating motor 22 is placed diametrically opposite the motor 21 relative to the central axis C of the table 14. The rotating shafts of the vibrating motors 21, 22 are respectively parallel to a vertical plane containing the central axis C and oppositely tilted with respect to the surface of the vibrating table at an angle of 75 degrees. Unbalanced weights 24 are fastened to both ends of the rotating shafts of the vibrating motors 21, 22. The centrifugal force resulting from the rotation of the unbalanced weights 24 exerts a vibrating force on the vibrating table 14 that works aslant to the surface thereof. The paired vibrating motors 21, 22 are driven in such a manner that the vibrations they make have an equal frequency and amplitude, and the vibrating forces they exert are displaced 180 degrees away from each other. When the vibrations caused by the paired motors 21, 22 are combined, the vibrating table 14 vibrates in such a manner as to move along a helical path whose central axis coincides with the central axis C of the vibrating table 14. But the vibration of the vibrating table 14 is not transmitted to the base 11 because of the support springs 18 interposed therebetween.

Such vibrating means as those employing cranks, cams or electromagnets may be used in place of the vibrating motors 21, 22. Also, the vibrating motors 21, 22 may be attached to the vibrating table 14 in other ways than that shown in the figures.

A bobbin 27 is fastened on the vibrating table 14 in such a manner that the axis thereof coincides with the central axis C of the vibrating table 14. A tube 1 through which an optical fiber 7 is to be passed is coiled around the bobbin 27. The optical fiber 7 is fed into the tube 1 from the upper end of a coil 6 of the tube. To ensure that no excessive bending stress develops in the optical fiber, the coil 6 of the tube should preferably have a diameter of not smaller than 150 mm. The optical fiber 7 used in this embodiment consists of an element optical fiber precoated with resin. The tube 1 is a steel tube. The outer periphery of the bottom flange 29 of the bobbin 27 is fastened to the vibrating table 14 with fastening jigs 31 so that the vibration of the vibrating motors 21, 22 is surely received. The bobbin 27 has a groove (not shown) cut around the circumference thereof, with successive ridges and recesses pointing toward the axis thereof. The groove is designed so that the tube 1 comes in close contact therewith.

A feed spool 34, which constitutes an optical fiber feeder 33, is placed beside the bobbin 27. The feed spool 34 is rotatably supported on a bearing stand 35. The feed spool 34 pays off the optical fiber 7 wound therearound to the flared inlet end 3 of the tube.

A drive motor 38 is provided next to the feed spool 34. The feed spool 34 and drive motor 38 are interlocked through a belt transmission 40. Rotated by the drive motor 38, the feed spool 34 pays off the optical fiber 7 to the tube 1 wound around the bobbin 27.

A cylindrical support guide 43 is provided near the point where the feed spool 34 pays off an optical fiber. The support guide 43 supports the optical fiber 7 paid off from the feed spool 34.

An optical fiber feed condition sensor 47 is installed downstream of the support guide 43. The optical fiber feed condition sensor 47 comprises a support column 48 and an optical fiber level sensor 49 attached thereto. The optical fiber level sensor 49 comprises an image sensor and an oppositely disposed light source. Installed in the pass line of the optical fiber 7, the optical fiber level sensor 49 senses the sagging condition thereof. A CCD line sensor is used as the image sensor.

To the optical fiber feed condition sensor 47 is connected a rotation speed controller 52 that controls the voltage of a power supply 39 to said drive motor 38 on the basis of signals from the optical fiber feed condition sensor 47. The rotation speed of the drive motor 38 or, in other words, the pay-off speed of the optical fiber 7 is controlled according to the level at which the optical fiber 7 interferes with the travel of the light from the light source in the optical fiber level sensor 49.

The speed with which the optical fiber 7 is passed through the tube 1 is not always constant but may vary when resonance occurs or depending on the surface condition of the inner wall of the tube 1 and the optical fiber 7. A change in the running speed of the optical fiber 7 in the tube 1 affects the feeding condition of the optical fiber 7 on the outside. If the feed speed fails to follow the passing speed, the optical fiber 7 may either sag excessively or overstretch and break, hindering smooth feeding of the optical fiber 7. But the feed speed of the optical fiber 7 can always be kept within the desired range by varying or stopping the rotation of the feed spool 34 depending on the travelling condition of the optical fiber 7 in the tube 1. Then, the optical fiber 7 is kept in the optimum condition (with a slight sagging as shown in FIG. 1), without oversagging or overstretching. Consequently, the optical fiber 7 is passed through the tube 1 without a hitch, with no load imposed thereon or no resistance offered to the passage thereof. Incidentally, an optical fiber 0.4 mm in diameter does not go into a steel tube having an inside diameter of 0.5 mm if a force of 20 gf or greater works thereon in a direction opposite that of feeding.

A cylindrical support guide 54 and an electromagnetic feeder 55 are provided on the exit side of the optical fiber feed condition sensor 47. The electromagnetic feeder 55 sends an optical fiber 7 from the support guide 54 to the flared end 3 of the tube.

The inlet and outlet of the support guides 43 and 54 should preferably have a smooth curved surface. The support guides 43 and 54 must be made of such materials as glass and plastic whose coefficient of friction is low enough to assure a smooth travel of the optical fiber 7. Provision may be made to supply a solid lubricant such as a powder of carbon, talc, molybdenum disulfide, etc. to the surface of the optical fiber 7 travelling through the support guides 43, 54.

Figure 3:
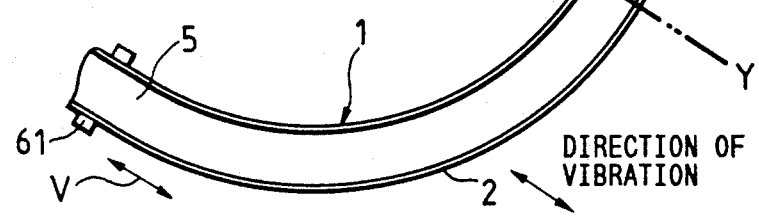
FIG. 3 is a vertical cross-sectional view showing how the inlet end of a tube is fastened.

A metal tube holder 57 is provided on the exit side of the electromagnetic feeder 55. The inside of the metal tube holder 57 is funnel-shaped as shown in FIG. 3.

Now a method of passing an optical fiber 7 through a tube 1 using the above-described apparatus will be described.

A coil 6 is formed in advance by winding a tube 1 around a bobbin 27. The tube 1 wound around the bobbin 27 need not always be in a single ring, but can be in multiple rings. In a coil of multiple rings, the first ring fits closely in a groove cut in the surface of the bobbin 27. The second and subsequent rings are arranged to fit in the recesses formed between the turns of the tube 1 of the preceding ring. Then, the bobbin 27 carrying the wound tube 1 is fastened on the vibrating table 14 in such a manner that the axis of the coil coincides with the central axis C of the vibrating table 14.

A suitable length of the tube is cut off from an unwound ring of the coil 6 following the lead-in section 2 thereof. The cut off length of the tube is curved in a horizontal plane. Then, the inlet end 4 of the tube passed through a guide hole 58 in the metal tube holder 57 is flared into a funnel-shape, and fastened to the metal tube holder 57 with a metal fastener 59. The remotest end 5 of the lead-in section 2 is fastened to the flange 29 of the bobbin 27 with a metal fastener 61.

An optical fiber 7 consisting of a precoated element fiber, is wound around the feed spool 34. The leading end 8 of the optical fiber 7 pulled out of the feed spool 34 is inserted through the metal tube holder 57 into the inlet end 4 of the tube, after passing through the support guide 43, optical fiber feed condition sensor 47, support guide 54 and feeder 55.

The drive motors 21, 22, the feeder 55 and the drive motor 38 of the feed spool 34 are started in that order.

With the drive motors 21, 22 attached to the vibrating table 14 in the place and position described previously, the vibrating table 14 is then subjected to a torque working around the central axis C thereof and a force working therealong. Consequently, a given point on the vibrating table moves along a helix H shown in FIG. 1. The vibration V thus produced is transmitted from the vibrating table 14 through the fastening jigs 31, the bobbin 27 and the coil 6 of tube to the lead-in section 2 thereof.

Referring now to FIGS. 3 and 4 (in FIG. 4, the curved lead-in section 2 of the tube is shown as a straight tube for convenience's sake), it will be described how the optical fiber 7 enters the tube 1 when the passing operation is started. The lead-in section 2 has a midway transition point T where the direction of vibration coincides with the center of the curvature of the inlet 2. In the section (hatched in FIG. 3) between the flared end 3 and the transition point T, vibration transmitted from the inner wall of the tube to the optical fiber 7 produces no conveying force. In this section, the pushing force of the feeder 55 sends the leading end of the optical fiber 7 forward. Also in this section, vibration keeps the optical fiber 7 from sliding along the inner wall of the tube, reduces the friction between the optical fiber 7 and the inner wall of the tube, and facilitates the forward motion of the leading end of the optical fiber 7 pushed by the feeder 55.

In the section between the transition point T and the remotest end 5 of the lead-in section 2 end, the conveying component of vibration increases progressively. The optical fiber 7 behind this section, or between the flared end 3 and the transition point T, is inside the tube and under the influence of the driving force of the feeder 55. Therefore, no force to prevent advance (owing to both the effect of centrifugal force and the static inertia of the optical fiber behind) works on the leading end of the optical fiber 7 in this section. As such, the leading end of the optical fiber 7 advances if the vibrating tube exerts any conveying force at all on the optical fiber 7 (or if the angle between the directions of vibration and passing is acute). The conveying force resulting from vibration carries the optical fiber 7 forward after the leading end thereof has passed the transition point T. When the leading end reaches the remotest end 5 of the inlet 2, the remotest end 5 lies at the uppermost end of the coil 6, where the optical fiber 7 passed into the tube 1 substantially along a line tangent to the coil 6. Once the optical fiber 7 has thus been properly passed into the tube 1, the rotation of the feeder 55 is stopped. Afterward, the feeder 55 serves as a holding guide.

With the technology disclosed in EPC Patent No. 91717, incidentally, the leading end of an optical fiber is inserted a given distance L before passing is started, as shown in FIG. 5. Accordingly, conveying force produced by vibration must be exerted on the optical fiber 7 at the flared end 3 to make the conveying force great enough to overcome a force owing to the effect of centrifugal force and a force owing to the static inertia of the optical fiber 7 behind the inlet end 3. The conveying force resulting from vibration becomes equal to the combined force to prevent the advance of the optical fiber at point P. Said distance L is greater than the distance between point P and the flared end 3 of the tube. The optical fiber does not advance while the leading end thereof stays upstream of point P. It is not until the leading end has passed point P that the optical fiber begins to move forward.

As is obvious from FIGS. 4 and 5, the conventional method inserts a considerable length of optical fiber into the tube before starting passing. By contrast, the preferred embodiment of this invention being described does not require such preliminary insertion.

Driven by a component of the force exerted by the inner wall of the tube 1 which works in the circumferential direction of the coil, the optical fiber 7 in the coil 6 of the tube moves further into the tube. Because the axis of the coil coincides with the central axis C of the vibrating table 14, the optical fiber 7 in the tube moves in a circle about the central axis C (in the clockwise direction P in the embodiment shown in FIG. 2).

Reference is now made back to FIG. 1.

When the helical vibration is transmitted through the vibrating table 14 to the coil 6 of the tube, the optical fiber 7 fed from the flared end 3 of the tube above the coil 6 continuously moves forward through the tube 1. That is, the vibration of the coil 6 moves the optical fiber 7 paid off from the feed spool 34 forward through the support guide 43, optical fiber feed condition sensor 47, support guide 54, feeder 55, flared end 3 of the tube, inlet 2, coil-formed tube 1, and outlet end of the tube. Thus, the optical fiber 7 is passed through the entire length of the coil 6 of the tube in a given time. Because the inlet end 4 the tube is fastened, the flared end 3 causes no damage to the optical fiber 7.

Any variation in the passing speed of the optical fiber 7 affects the feed condition thereof at the point where the optical fiber level sensor 49 is installed, with the resulting change in the feed condition being instantly detected by the optical fiber level sensor 49. If the optical fiber level sensor 49 senses that the optical fiber 7 is overstretched, a corresponding signal will be sent to the drive motor 38 to increase the rotation speed of the feed spool 34, thereby increasing the feed speed of the optical fiber 7. If an excessive sagging of the optical fiber 7 is sensed, the drive motor 38 will be controlled to slow down the feed speed of the optical fiber 7. In this way, any abnormal condition in the forward travel of the optical fiber is instantly sensed, corrected and returned to the normal condition.

Preferred Embodiment II

FIG. 6 shows another embodiment of this invention. In all of the following embodiments, the devices and members similar to those shown in FIGS. 1 to 3 will be designated by the same reference numerals, with a detailed description thereof omitted.

In this second preferred embodiment, the optical fiber 7 paid off from the coil 9 thereof drops into the lead-in section 2 of the tube under its own weight.

A frame 64 is fastened to the floor 10 diagonally above a vibrating table 14. A bobbin 66 around which an optical fiber 7 is wound is placed on the frame 64.

An optical fiber guide 68 is provided next to the frame 64. The optical fiber guide 68 has a guide tube 70 supported by a bracket 69. The guide tube 70 consists of a vertical portion 71 and a curved portion 72 curved diagonally downward. The upstream end of the curved portion 72 of the guide tube 70 opens diagonally downward. The surface of the frame 64 on which the bobbin is placed is tilted so that the axis of the coil of the optical fiber faces the opening of the curved portion 72 of the guide tube 70.

A metal tube holder 74 is provided next to the optical fiber guide 68 on the exit side thereof. The metal tube holder 74 has a through hole 75. Because the end 3 of the tube passed through the through hole 75 is flared, the inlet end 4 of the tube is firmly held in the through hole 75. As such, the inlet end 4 of the tube held by the metal tube holder 74 does not move, either diametrically or longitudinally.

The tube 1 is wound around the bobbin 27 to form a coil 6 of the tube, with the last ring thereof fastened with an adhesive tape 30. The lead-in section 2 of a given length is unwound from the coil, curved upward and extended. The inlet end 4 is fastened to the metal tube holder 74. A coil 9 of the optical fiber 7 is as wound at the fiber manufacturer. The forward end of the optical fiber 7 paid off from the bobbin 66 is passed into the inlet end 4 through the guide tube 70. Then, drive motors 21, 22 are started. A reversed torsion, which will be described later, is not given to the optical fiber 7 wound into the coil 9.

The optical fiber 7 falls under gravity through the vertical portion 71 of the guide tube 70 and the lead-in section 2 of the tube 1. As such, this embodiment reduces the load to be borne when the optical fiber 7 is unwound from the coil 9 and the length of the optical fiber 7 to be passed in initially.

Preferred Embodiment III

FIG. 7 shows a third embodiment of this invention. In this embodiment, the inlet end of a tube is held in such a manner as not to permit only diametrical motion. Longitudinal motion is permitted. Also, a feeder is provided to push an optical fiber into the tube, which permits passing the optical fiber through the tube at a speed faster than the speed of conveyance by vibration. But this embodiment is not applicable to longer tubes whose length exceeds several hundred meters because of the limit in the passable length of the optical fiber mentioned previously.

As shown in the figure, an optical fiber container 77 is provided beside the bobbin 27. The optical fiber container 77 consists of a cylindrical container proper 78 having an open top. The container 77 contains an optical fiber 7 that is fed into the container proper 78 that is mounted and rotated on a turn table (not shown), as will be described later.

An optical fiber guide 81 is disposed next to the optical fiber container 77. The optical fiber guide 81 has a guide tube 83 supported on a stand 82. The downward-curved inlet end of the guide tube 83 opens toward the optical fiber container 77 substantially on the central axis thereof.

A belt feeder 86 is disposed on the exit side of the optical fiber guide 81. The belt feeder 86 comprises a pair of endless belts 88, one lying on top of the other, on a table 87. Driven by motor-powered pulleys 89, the belts 88 send the optical fiber 7 hold therebetween from the optical fiber guide 81 to the inlet end 4 of the tube.

A cylindrical metal tube holder 92 is placed on the exit side of the belt feeder 86. The inlet end 4 of the tube is passed through the metal tube holder 92 whose inside diameter is somewhat larger than the outside diameter of the tube 1. Though allowed to slide longitudinally, the inlet end 4 of the tube is not permitted to move diametrically, i.e., up and down and sidewise.

The following is a method of passing an optical fiber 7 through a tube 1 using the above-described apparatus.

While a coil 6 of the tube is formed, a coil 9 of the optical fiber 7 is formed inside the optical fiber container 77 by laying up piles thereof. A bobbin 27 carrying a coil of the tube 1 is fastened to a vibrating table 14 with through bolts 32. The optical fiber 7 is pulled up to a level above the optical fiber container 77, proceeding downward from the uppermost loop of the coil 9. On this occasion, each loop of the optical fiber 7 is twisted 360 degrees maximum. To regain the original condition, the twisted optical fiber warps inside the tube 1, offering a resistance to conveyance. Therefore, a reversed twist should preferably be given to the optical fiber 7 when it is fed into the container 77 so that the twist the optical fiber 7 receives on being unwound is offset. The optical fiber thus kept in a container does not curl like the one wound around a spool or the like.

FIG. 8 shows a method of giving a reversed twist to an optical fiber 7. The optical fiber 7 is fed through a guide tube 96, caterpillar feeder 95 and a rotating guide tube 97 into the container proper 78 of the optical fiber container 77. The rotating guide tube 97 is eccentric to the container proper 78 by a distance $\delta$, and is rotated by a motor (not shown) through a gear transmission 98. The container proper 78 and the rotating guide tube 97 are rotated in the same direction, about the central axes X and Y thereof. Fed from the rotating guide tube 97, the optical fiber 7 is circumferentially piled up from the bottom of the container proper 78 to form a coil, becoming progressively eccentric by a width of $2\delta$. If the rotating speed of the container proper 78 is $V_P$ and that of the rotating guide tube 97 is $V_G$, the angle of a reversed twist $\theta = 360°(1 - V_P/V_G)$. If the rotating speed $V_P$ of the container proper 78 is made sufficiently smaller than the rotating speed $V_G$ of the rotating guide tube 97, the angle of the reversed twist $\theta$ becomes substantially equal to 360 degrees. Therefore, the optical fiber 7 forms no kink when unwound from the coil 9.

Then, a given length of the optical fiber 7 taken out of the container 77 is passed through the optical fiber guide 81, the belt feeder 86 and the flared end 3 of the tube until the leading end 8 of the optical fiber 7 enters the tube 1.

When preparations for passing are completed, the vibrating motors 21, 22 and belt feeder 86 are started.

Referring now to FIGS. 9(a) and 9(b), the advance of the optical fiber 7 into the tube 1 will be described. Because the metal tube holder 92 firmly holds the inlet end 4, the lead-in section 2 does not move up and down and sidewise, though vibrating longitudinally. Therefore, no driving force f owing to vibration works on the optical fiber 7 at the lead-in section 2 of the tube 1. The advance of the optical fiber 7 in this region is solely due to the pushing force F exerted by the belt feeder 86.

In the coil 6 of the tube 1 lying beyond the remotest end 5 of the lead-in section 2, the tube 1 vibrates helically, and the inner wall thereof pushes the optical fiber 7 up and diagonally forward. Therefore, the optical fiber 7 jumps, or slides along the inner wall of the tube, diagonally forward. Thus, a circumferential component of the force exerted by the inner wall of the tube 1 and a pushing force exerted by the belt feeder 86, in combination, cause the optical fiber 7 to travel forward in the tube. That is, the two forces produced by vibration and exerted by the feeder move the optical fiber 7 forward through the tube.

The optical fiber 7 pushed by the belt feeder 86 into the flared end 3 of the tube will encounter the following resistances:

(a) Resistance which the friction with the tube wall offers to forward travel;

(b) Resistance which the coiled tube offers to forward travel;

(c) Resistance which the kinked optical fiber offers to forward travel; and (d) Backward force from near the top of the inner wall of the tube.

Resistances (b) and (c) work to increase the frictional resistance (a).

Because resistance (b) is greater in the coiled tube 1 than in a straight tube, transmission of the pushing force from the flared end 3 throughout the entire length of the optical fiber is not as easy. However, the helical vibration of the coil 6 produces an equal (uniform) vibration at all points of the tube 1. The vibration is a simple harmonic motion slanting in the longitudinal direction of the tube, having a horizontal component tangential to the coil 6 of the tube and exerting a driving force f on the optical fiber 7. The driving force f works tangentially to the coil 6 of the tube at all points thereof. Therefore, the driving force f always works on the optical fiber 7 in the tube 1 in the longitudinal direction thereof or in the direction of travel. Working along the curve of the tube, the driving force f reduces the friction owing to vibration and keeps the optical fiber 7 from getting pressed against the tube wall. In other words, the driving force f works to keep the optical fiber 7 from getting out of the right path. The optical fiber 7 pushed by force F into the curved tube from the flared end 3 moves forward as if it was traveling through a straight tube under the influence of the driving force f. The vibration of the tube 1, of course, reduces the friction between the optical fiber and the tube wall. The method of this invention, therefore, overcomes the resistance (a) from the friction with the tube wall by vibration and the resistance (b) owing to the curved tube 1 by a combination of vibration and the driving force f. Keeping the optical fiber 7 in the tube from sagging, the driving force f assures easier transmission of the pushing force F throughout the entire length of the optical fiber. The resistance (c) owing to the kink of the optical fiber can also be overcome by feeding a pre-twisted optical fiber 7 from a coil 9 held in the optical fiber container 77. The optical fiber 7 kept in this condition has no tendency to kink. The frictional resistance (a) from the tube wall can be reduced by applying a lubricant on the surface of the optical fiber, too. The resistance (b) owing to the curved tube can also be reduced by increasing the coil diameter.

Allowed to move in the longitudinal direction of the tube 1, the inlet end 4 thereof is less subjected than otherwise to the repeated bending force exerted by the vibrating tube 1, thus remaining undamaged.

Preferred Embodiment IV

Figure 10:
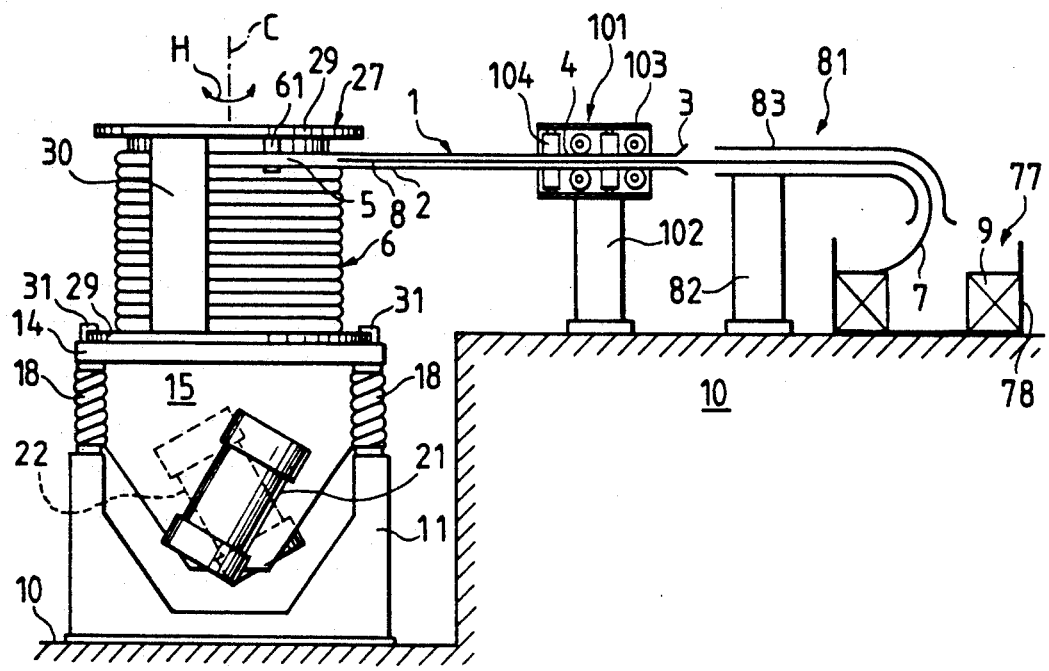
FIG. 10 is a side elevation showing a fourth preferred embodiment of an optical fiber passing apparatus according this invention.

FIG. 10 shows still another embodiment of this invention. In this embodiment, the inlet end of the tube is firmly held. A conveying force resulting from vibration pulls out an optical fiber from a coil thereof.

An optical fiber container 77 and an optical fiber guide 81 are placed beside a bobbin 27.

A tube holder 101 is placed next to the optical fiber guide 81 on the exit side thereof. The tube holder 101 has a casing 103 supported by a stand 102, with guide rolls 104 rotatably set in the casing 103. The guide rolls 104 are paired in such as manner as to hold a tube 1 therebetween. The pairs of guide rolls are alternately set in the vertical and horizontal positions. As such, the inlet end 4 of the tube held by the tube holder 101 is allowed to move longitudinally, but not diametrically.

By winding a tube 1 around the bobbin 27, a coil 6 of the tube is formed in advance. A ring of the tube 1 making up the lead-in section 2 thereof is then unwound from the coil 6 and cut to a suitable length. The lead-in section 2 of the tube 1 is then pulled from the coil 6 to the tube holder 101. After the inlet end 4 has been passed through the tube holder 101, the foremost end 3 of the tube is flared into a funnel-like shape. The remotest end 5 of the lead-in section 2 is immovably fastened to the flange 29 of the bobbin 27 with a metal fastener 61. An optical fiber 7 is placed in the optical fiber container 77.

A given length of the optical fiber 7 unwound from the coil 9 in the container 77 is passed into the tube 1 through an optical fiber guide 81 and the flared end 3 of the tube 1. Because only the leading end 8 of the optical fiber 7 is inserted in the tube 1, the conveying force the vibrating tube 1 exerts on the optical fiber 7 is limited to the lead-in section 2 of the tube. Accordingly, the conveying force is too small to unwind fiber 7 from the coil 9 and carry it to the flared end 3 that portion of the optical fiber 7 which follows the lead-in section 2. The length of the preliminarily inserted optical fiber is between a few meters and ten-plus meters, varying with the size and surface condition of the tube 1 and optical fiber 7 and the condition of the coil 9 of the optical fiber 7. A pull force on the order of several tens of grams works on the optical fiber 7 as a result of the preliminary insertion. The preliminary insertion is done either manually or by feeding through pinch rolls.

When preparations for passing are complete, drive motors 21, 22 are started. Carried forward by the action of helical vibrations, the optical fiber 7 unwound from the coil 9 in the optical fiber container 77 continuously moves into the tube 1 through the flared end 3 thereof.

Preferred Embodiment V

Figure 11:
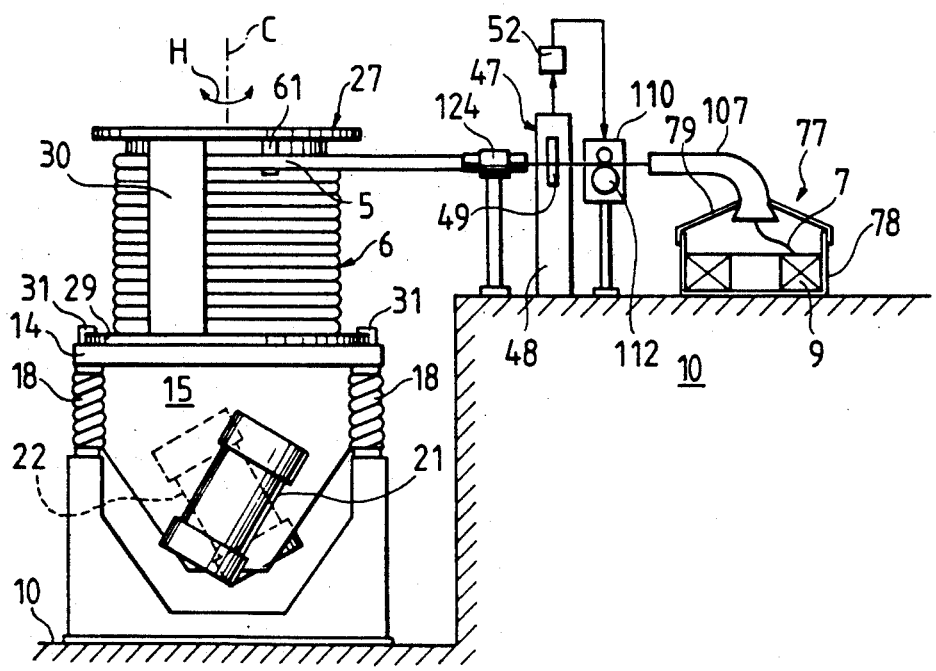
FIG. 11 is a side elevation showing a fifth preferred embodiment of a optical fiber passing apparatus according to this invention.
Figure 12:
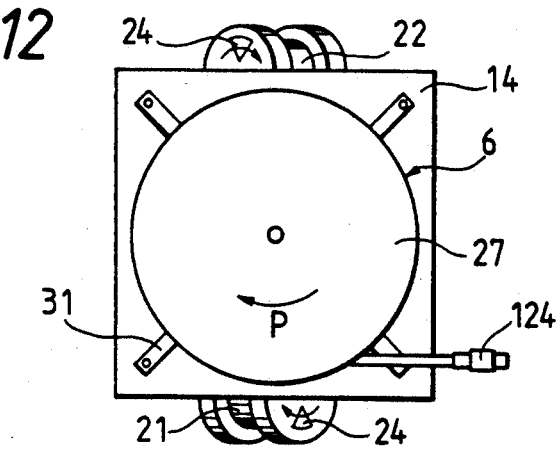
FIG. 12 is a plan view of a vibrating table of the apparatus shown in FIG. 11.

FIGS. 11 and 12 show yet another embodiment of this invention.

A guide tube 107 is fastened to the cover 79 of an optical fiber container 77. The guide tube 107 extends from the top of the container 77 to a roll feeder 57.

Figure 13:
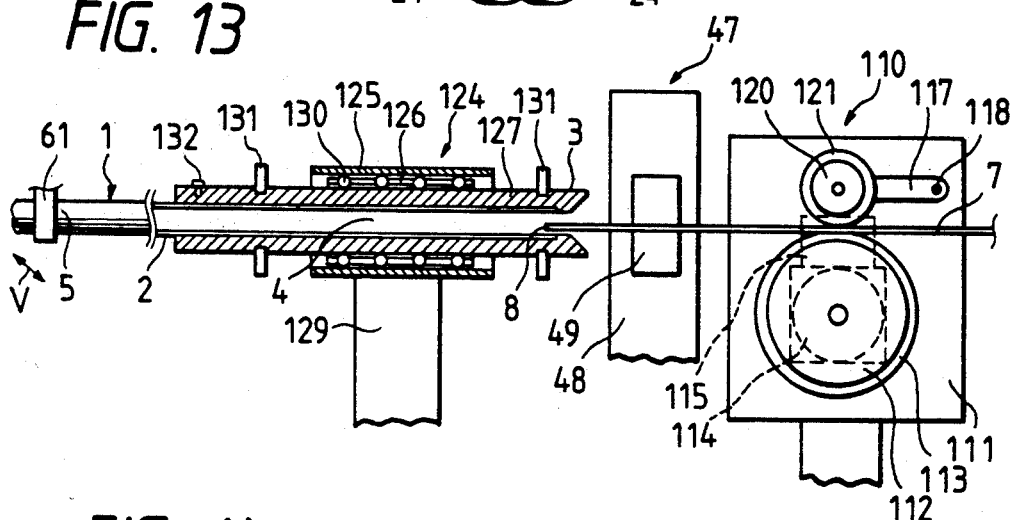
FIG. 13 is a detail view of a roll feeder and a tube holder on the apparatus shown in FIG. 11.

A roll feeder 110 is disposed on the exit side of the guide tube 107. As shown in FIG. 13, the roll feeder 110 has a drive roll 112 rotatably set in a housing 111. The drive roll 112 is rotated by a gear motor 114 whose speed, in turn, is controlled by a speed controller 115. To the housing 111 is connected an arm 117 by means of a pin 118. The arm 117 carries a rotatably mounted hold-down roll 120 at the tip thereof. The arm 117 is manually rotated about the pin 118 to bring the hold-down roll 120 into and out of contact with the drive roll 112. The drive roll 112 and hold-down roll 120 are respectively covered with rubber tires 113, 121. The drive roll 112 and hold-down roll 120 hold the optical fiber 7 from the guide tube 107 under the weight of the hold-down roll 120. The rotation of the drive roll 112 sends the optical fiber 7 into the inlet end 4 of the tube.

A tube holder 124 is disposed on the exit side of the roll feeder 110, with an optical fiber feed condition sensor 47 placed therebetween. As shown in FIG. 13, the tube holder 124 comprises an outer cylinder 124, an intermediate cylinder 125 and an inner cylinder 127. A stand 129 fastens the outer cylinder 125 to the floor 10. A number of rotatable balls 130 are fitted on the intermediate cylinder 126. The balls 130 projecting on both sides of the intermediate cylinder 126 are in contact with the inner surface of the outer cylinder 125 and the outer surface of the inner cylinder 127. Therefore, the inner cylinder 127 is allowed to rotate and move axially, but not permitted to move diametrically. A top ring 131 is fitted near each end of the inner cylinder 127 to prevent the disengagement thereof from the outer cylinder 125.

The inlet end 4 of the tube is inserted in the inner cylinder 127 of the tube holder 124 and fastened with a setscrew 132. The roll feeder 110 pulls out the looped up optical fiber 7 from the top end thereof. The optical fiber 7 is then fed to the tube 1 through the guide tube 107, roll feeder 110, optical fiber feed condition sensor 47 and tube holder 124.

Figure 14:
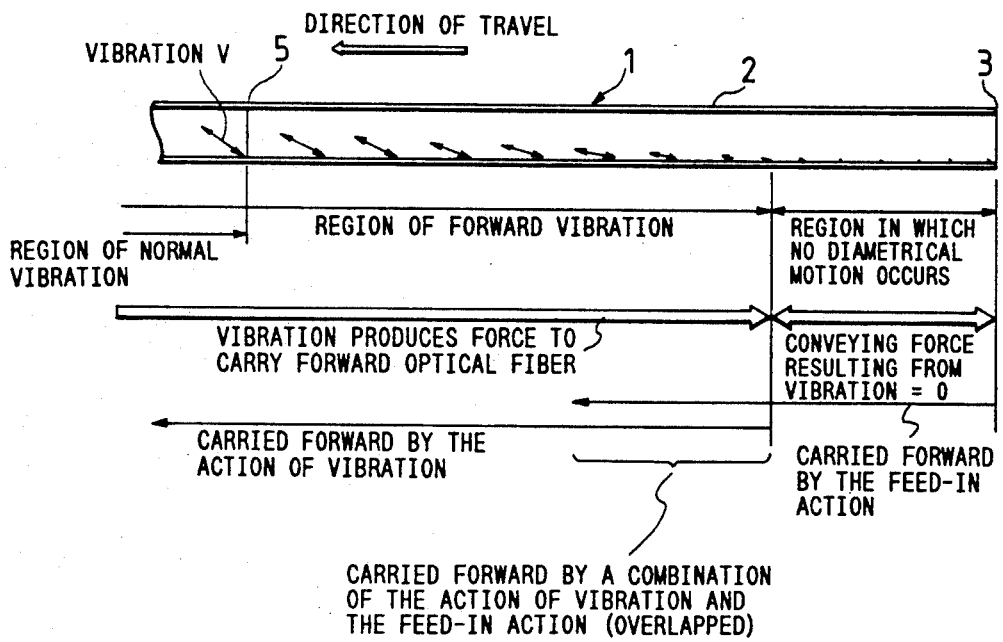
FIG. 14 illustrates how an optical fiber is carried forward at the inlet end of a tube on the apparatus shown in FIG. 11.

Referring to FIG. 14, the advance of the optical fiber 1 into the tube 1 immediately after the start of insertion will be described now. Near the flared end 3, the tube 1 is allowed to move only axially, not diametrically. Therefore, the inner wall of the vibrating tube exercises no conveying force on the optical fiber 7 in this region. But the roll feeder 110 advances the leading end 8 of the optical fiber 7. The vibration of the tube also reduces the friction between the leading end 8 of the optical fiber 7 and the inner wall of the tube, thereby facilitating the action of the roll feeder 110 to advance the leading end 8 of the optical fiber 7.

In a positive vibration area following the area in which diametrical vibration is inhibited, the diametrical component of vibration increases progressively. No force to check advance (owing to the centrifugal effect and the static inertia of the optical fiber behind) works on the leading end of the optical fiber 7 in this region because the optical fiber 7 in the upstream diametric vibration inhibited area is inside the tube and, in addition, under the influence of the driving force exerted by the roll feeder 110. Accordingly, the conveying force owing to vibration causes the optical fiber 7 to advance when the leading end thereof enters the positive vibration area. When the leading end of the optical fiber 7 reaches the remotest end 5 of the lead-in section 2 of the tube, the remotest end 5 is at the uppermost end of the coil 6 of the tube. Thus, the optical fiber 7 is passed into the tube 1 substantially tangentially to the coil 6. When the optical fiber 6 has thus been properly brought into the regular passing position, the drive roll 112 of the roll feeder 110 is stopped, with the hold-down roll 67 being retracted above away from the optical fiber. After this, the drive roll 112 serves as a guide to hold the optical fiber.

In the above example, the drive roll 112 of the roll feeder 110 can be stopped and functionally switched into a holding guide after the optical fiber 7 has been brought into the passing position. But the drive roll 112 may instead be allowed to continue driving even in that state. In this instance, the feed rate of the optical fiber is adjusted so that the speed with which the optical fiber 7 is fed to the flared end 3 of the tube is below the speed of the optical fiber 7 conveyed by the action of vibration. That is, the roll feeder 110 exerts a braking force on the optical fiber 7 being passed into the tube 1. This permits adjusting the surplus length of the optical fiber 7 in the tube 1. The surplus length increases as the feed rate of the optical fiber becomes closer to the speed of the optical fiber 7 conveyed forward by helical vibration, and vice versa. By the same method, the undulation of the optical fiber passed through the tube can be reduced, too. The less the undulation, the fewer will be the chances of the optical fiber coming in contact with the top surface of the inner wall of the tube. Then, the optical fiber is passed forward more smoothly.

Figure 15:
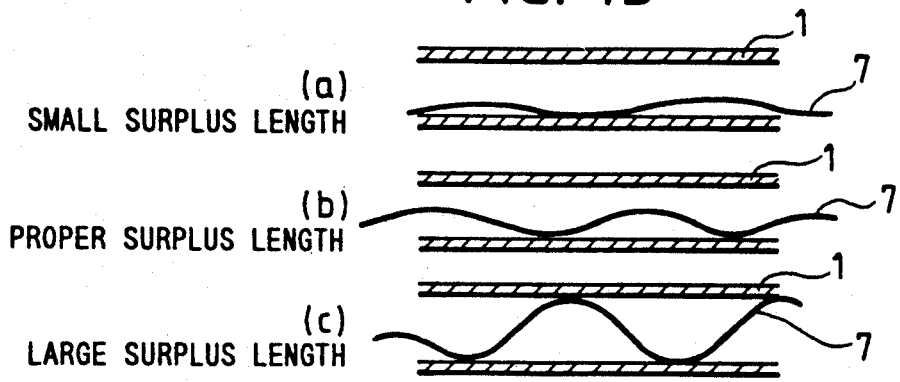
FIG. 15 shows the condition of an optical fiber in the tube, with different surplus lengths.

The optical fiber 7 passed into the tube 1 must have a proper surplus length. FIG. 15(a) shows an optical fiber 7 with an insufficient surplus length. Such an optical fiber involves the risk of breaking, unable to follow an elongation that might occur when temperature changes. FIG. 15(b) shows an optical fiber with a proper surplus length. FIG. 15(c) shows an optical fiber with an excess surplus length. Such an optical fiber bends more, receives greater pressure from the tube wall and, thus, travels forward less smoothly. An appropriate surplus length can be obtained by adjusting the feed rate of the optical fiber as described above.

An optical fiber 7 being passed into a tube 1 may sag between the roll feeder 110 and tube holder 124. On detecting a sag, the optical fiber feed condition sensor 47 sends a signal to decelerate the drive roll 112 of the roll feeder 110, thereby eliminating the sag. The drive roll 112 stops when the sagging of the optical fiber 7 exceeds a preset limit.

Preferred Embodiment VI

Figure 16:
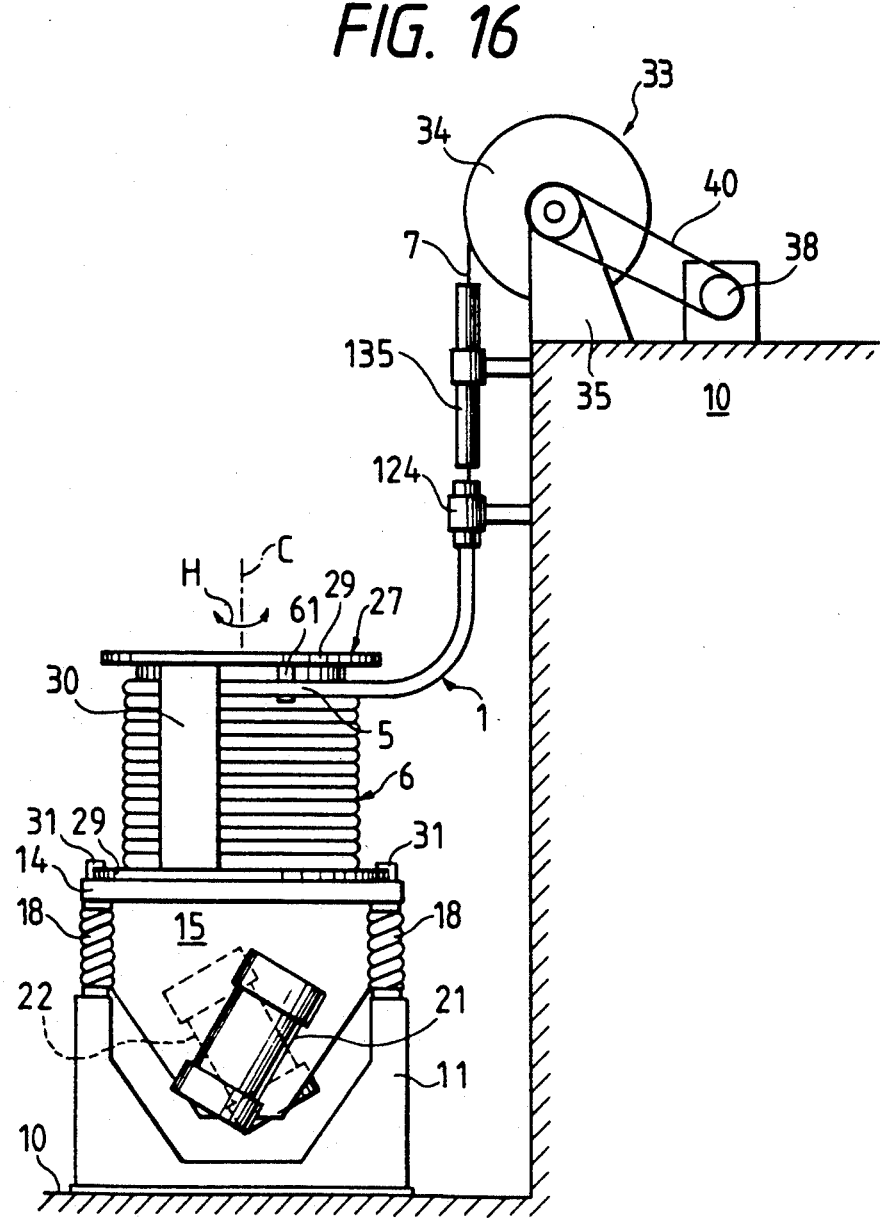
FIG. 16 is a side elevation showing a sixth preferred embodiment of an optical fiber passing apparatus according to this invention.

FIG. 16 shows still another embodiment of this invention.

This embodiment is a modified version of the preferred embodiment II shown in FIG. 6. This embodiment differs from the embodiment II in FIG. 6 in that the inlet end of the tube is longitudinally movable and that the optical fiber 7 from a feed spool 34 is directly fed to a guide tube 135. Part of the feed spool 34 on an optical fiber feeder 33 projects forward from the floor 10, with the straight guide tube 135 vertically disposed directly thereunder. In this embodiment, the rotating speed of the feed spool 34 is adjusted so that the feed rate of the optical fiber 7 to the inlet end 3 of the tube is below the speed with which the optical fiber is conveyed forward by the action of vibration. An optical fiber feed condition sensor of the type described before may be installed to detect the sagging of the optical fiber 7. Then, the rotation of the feed spool 34 may be either decelerated or stopped according to the amount of sagging detected.

Preferred Embodiment VII

Figure 17:
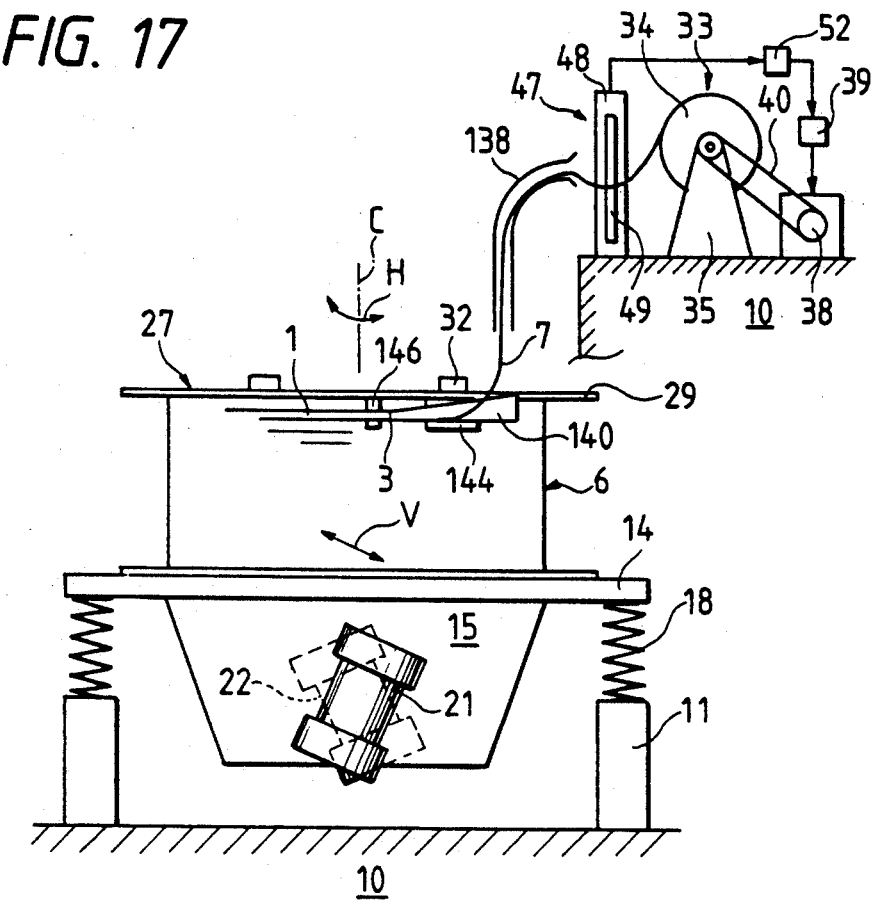
FIG. 17 is a side elevation showing a seventh preferred embodiment of an optical fiber passing apparatus according to this invention.

FIG. 17 shows a seventh embodiment of this invention.

An optical fiber feeder 33 and an optical fiber feed condition sensor 47 are disposed diagonally above a bobbin 27. A bend optical fiber guide 138 is provided on the exit side of the optical fiber feed condition sensor 47. The guide 138 leads the optical fiber 7 from the optical fiber feed condition sensor 47 to an optical fiber guide 140. The inlet and outlet ends of the guide 138 should preferably have a smoothly machined curved surface. To ensure that the falling of the optical fiber 7 under gravity is not inhibited, the guide 138 must be made of material with a low coefficient of friction such as glass and plastics.

Figure 18:
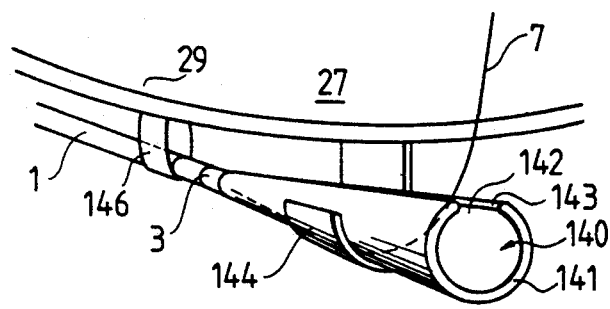
FIG. 18 is a perspective view of an optical fiber guide attached to a bobbin on the apparatus shown in FIG. 17.

An optical fiber intake guide 140 is disposed directly below the guide 138. The main portion 141 of the intake guide 140 is shaped like a trumpet as shown in FIG. 18, having a slit 142 that opens upward. The intake guide 140 is suspended from the top flange 29 of the bobbin 27 by means of a metal holder 144.

Provision may be made in the guide 138 or optical fiber intake guide 140 to apply a solid lubricant, such as a powder of carbon, talc, and molybdenum disulfide on the surface of the optical fiber 7 passing therethrough.

Figure 19:
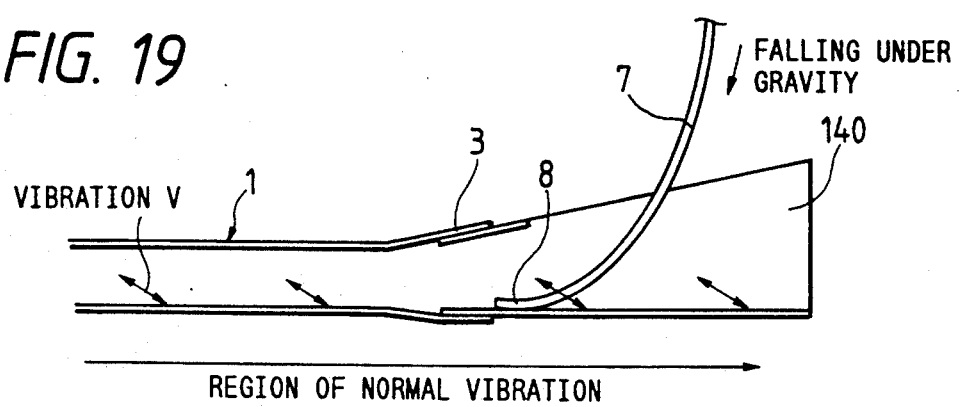
FIG. 19 illustrates how an optical fiber is carried forward at the inlet end of a tube on the apparatus shown in FIG. 11.

In this apparatus, the inlet end 4 of the tube is fastened to the top flange 29 of the bobbin 27 with a metal fastener 146. Then, the smaller-diameter end of the intake guide proper 141 is connected to the tip 3 of the tube. Referring now to FIGS. 18 and 19, the forward motion of the optical fiber 7 at the inlet of the tube 1 will be described. The optical fiber 7 fed from the optical fiber feeder 33 to the bend 138 falls through the slit 142 into the optical fiber intake guide 140 under its own weight. The optical fiber intake guide 140 vibrates together with the coil 6 of the tube. Therefore, the optical fiber 7 in the intake guide 140 enters the tube from the lead-in section 2 thereof, under the influence of the conveying force produced by the vibration V of the inner wall of the guide. The slit 142 in the intake guide 140 is of such width that the edges 143 thereof remain out of contact with the optical fiber 7 fed from above even when the guide 140 vibrates together with the bobbin 27. Therefore, the optical fiber 7 does not spring out from the inlet end 3 of the vibrating tube.

Preferred Embodiment VIII

Figure 20:
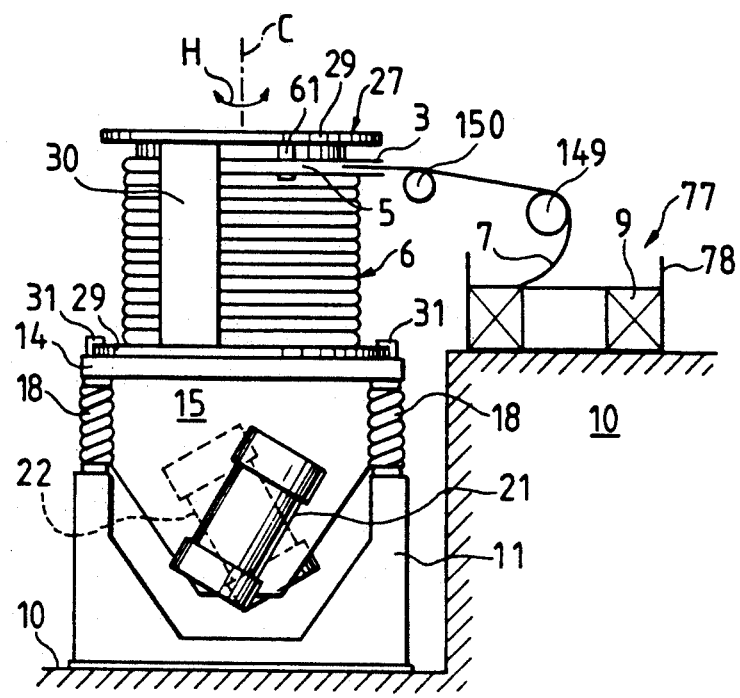
FIG. 20 is a side elevation showing an eighth preferred embodiment of an optical fiber passing apparatus according to this invention.

FIG. 20 shows an eighth embodiment of this invention, which is a modified version of the fourth embodiment. A major difference from the fourth embodiment is that the inlet end of the tube is not fastened.

A deflector roll 149 is provided directly above an optical fiber container 77 beside a bobbin. A guide roll 150 is disposed near the inlet end of the tube. The conveying force resulting from vibration pulls out the optical fiber 7 along the axis of a coil 9 thereof in the container 77. Supported and led by the deflector roll 149 and guide roll 150, the optical fiber 7 thus pulled out travels to the inlet end 3 of the tube.

With the apparatus just described, the passing operation can be carried out in the same way as with the foregoing embodiments, except that preliminary insertion is indispensable. The deflector roll 149 and guide roll 150, whose function is only to support and guide the optical fiber 7, may be either rotatable or stationary.

Preferred Embodiment IX

Figure 21:
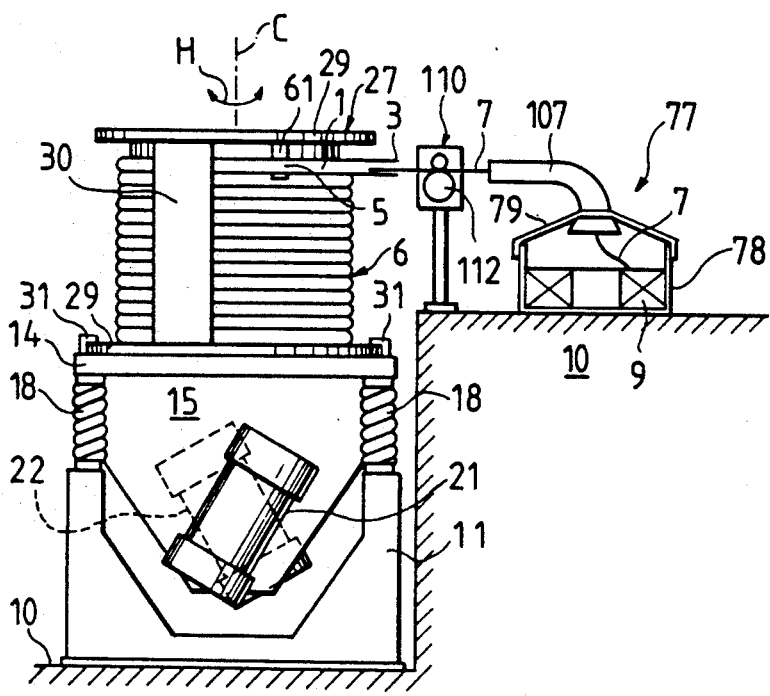
FIG. 21 is a side elevation showing a ninth preferred embodiment of an optical fiber passing apparatus according to this invention.

FIG. 21 shows a ninth embodiment of this invention, which is a modified version of the fifth embodiment. A major difference from the fifth embodiment is that the inlet end of the tube is not fastened.

A roll feeder 110 is disposed next to a guide tube 107 fastened to the cover 79 of an optical fiber container 77 on the exit side thereof. The exit end of the roll feeder 110 is close to the inlet end of the tube. Though not shown, the roll feeder 110 has a gear motor 114 and a speed controller 115 or the type shown in FIG. 13.

With the apparatus just described, the passing operation can be carried out in the same way as with the foregoing embodiments. No preliminary insertion is needed. This apparatus permits pushing the optical fiber 7 into the tube 1 as required. Or otherwise, a brake may be applied to the optical fiber 7 carried forward by the force of vibration. In the latter case, the braked optical fiber 7 in the tube 1 is pulled backward. The resulting reduction in undulation permits a stable insertion of the optical fiber 7 as described previously.

Preferred embodiments VIII and IX can be designed as simple structures.

Preferred Embodiment X

Figure 22:
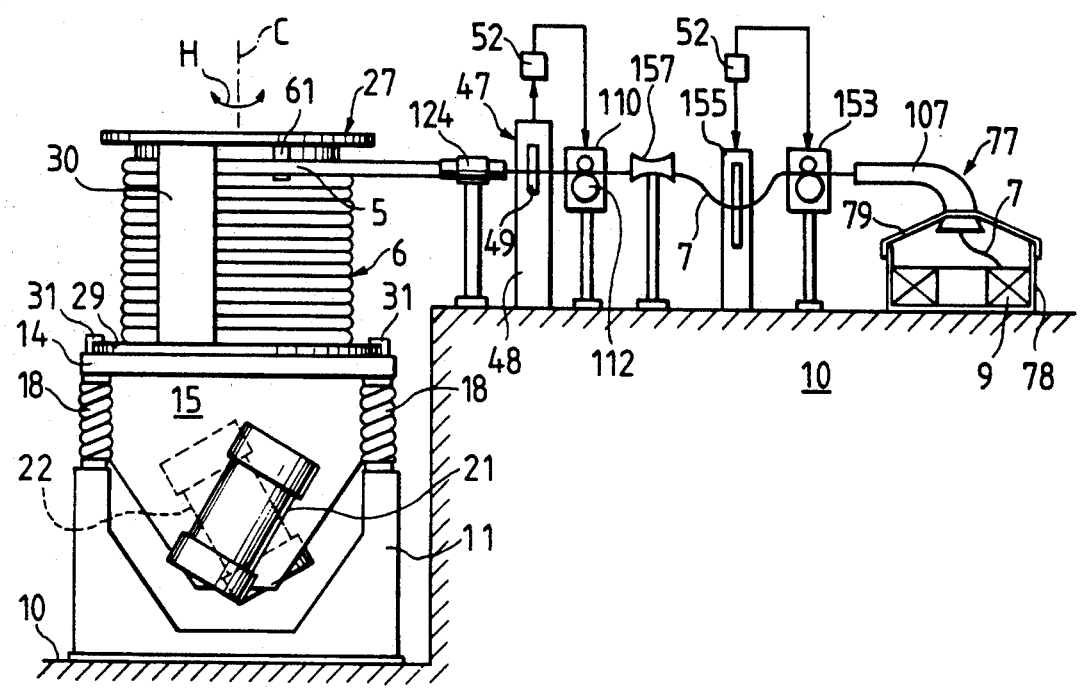
FIG. 22 is a side elevation showing a tenth preferred embodiment of an optical fiber passing apparatus according to this invention.

FIG. 22 shows a last embodiment of this invention, which is a modified version of the fifth embodiment. A major difference from the fifth embodiment is that a second roll feeder is provided on the exit side of an optical fiber container to pull out an optical fiber therefrom.

As shown in the drawing, a second roll feeder 153, a second optical fiber feed condition sensor 155 and a support guide 157 are disposed between an optical fiber container 77 and a first roll feeder 110. The second roll feeder 153 and second optical fiber feed condition sensor 155 are of the same structure as the first roll feeder 110 and the first optical fiber feed condition sensor 47. The support guide 157 is of the same design as the support guide 54 shown in FIG. 1. The length of the support guide 157 is determined according to the distance between a bobbin 27 and an optical fiber container 77. For example, when the optical fiber container 77 is separated from the bobbin 27 (by, for instance, 10 m), the length of the support guide 157 is increased accordingly.

The second roll feeder 153 feeds the optical fiber 7 pulled out of the optical fiber container 77 to the first roll feeder 110. The optical fiber 7 is fed to the first roll feeder 110 in such a manner as to sag between the second roll feeder 153 and support guide 157. Consequently, no tension works on the optical fiber 7 while being fed to the first roll feeder 110. The second roll feeder 153 ensures the pull-out of the optical fiber 7 from the optical fiber container 77. In this embodiment, a tube holder 124 holds the inlet end of the tube. But the inlet end need not be held when the tube length is relatively short.

EXAMPLE

In order to confirm the effect of this invention, an optical fiber was passed through a steel tube, using the apparatus shown in FIG. 11, under the following conditions:

(1) Test Specimens
  Coils of steel tubes:
    Seven different coils (having 10 to 20 layers of rings), each being wound around a steel bobbin having a barrel diameter of 1200 mm in good order, of seven different steel tubes 10 km in length, having an outside diameter of 0.8 mm to 2.0 mm and an inside diameter of 0.5 mm to 1.6 mm.
  Optical fibers:
    Quartz glass optical fiber (125 μm in diameter) coated with silicone resin, having a diameter of 0.4 mm.

(2) Vibrating Condition
  Having 10 to 20 layers of rings, each coil of the steel tube tested vibrated substantially equally at all points thereof.
  Angle of vibration with respect to the horizontal plane of the coil: 15 degrees
  Frequency of vibration: 20 Hz
  Vertical component of total amplitude: 1.25 mm–1.55 mm (3) Roll Feeder
  When the optical fiber has been put in the steady passing condition, the drive roll of the roll feeder is stopped to function as an optical fiber support guide, with the hold-down roll retracted.

Under the above conditions, the optical fibers were smoothly passed through the steel tubes without any hitch. It was confirmed that the optical fibers were passed through the entire length of the steel tubes within a given length of time at a speed of 2 m/min. to 4 m/min. No difficulty was encountered even in passing an optical fiber through a tube whose diameter was as small as 2 mm or under and whose length was as large as about 10 km. Of course, the optical fibers passed through the steel tubes suffered no degeneration.

To adjust the amount of surplus length and the magnitude of undulation, the feed roll feeder was always kept in motion. The speed of the drive roll was adjusted to control the feed rate of the optical fiber within the range of 40% to 95% of the conveyance speed owing to vibration. All this resulted in the attainment of appropriate surplus length and the suppression of undulation, thereby assuring a smooth travel of the optical fiber through the steel tube.

Though the threadlike piece was optical fibers in the preferred embodiments described herein, this invention is also applicable to the passing of other types of threadlike pieces, such as wires of such metals as copper and steel and of such nonmetallic substances as plastics. The number of threadlike pieces passed through a tube is not limited to one. Multiple threadlike pieces may be passed through a tube if the inside diameter of the tube and the diameter of the threadlike pieces permit. The tube need not be of steel, but may be of many other types of materials, such as aluminum and synthetic resins. Any other subsequent process, such as surface polishing, may be added as to the passing of the threadlike piece through the metal tube as desired. Although not always necessary, the central axis of the coil of the tube should preferably coincide with the central axis of a helix and extend vertically. Furthermore, other combinations of the spools, feeders, inlet end holders and other means than those disclosed hereabove are also included within the scope of this invention.

What is claimed is:

1. A method of passing a threadlike piece through a tubular produce, comprising the steps of:

forming a coil of a tube having an inlet end;

feeding a threadlike piece through the inlet end of the tube at a feed speed;

vibrating the coil of the tube so that a given point of the tube reciprocates along a helical path for applying to said threadlike piece a force for causing the threadlike piece to move through said coil of the tube at a speed of conveyance attributable to the vibration of the coil; and controlling the feed speed of the threadlike piece by applying a force to the threadlike piece in the longitudinal direction thereof by a feeder acting on the threadlike piece at a position sufficiently close to the upstream of the inlet end of the tube, that the threadlike piece remains unbent until it reaches the inlet end of the tube and adjusting the applied force for causing the feed speed at said inlet end of the tube to be at least slightly higher than said speed of conveyance of the threadlike piece through the tube for positively pushing the threadlike piece into the tube.

2. A method as claimed in claim 1 in which the step of feeding the threadlike piece comprises feeding the threadlike piece to the inlet end of the tube having a lead-in section separated from the coil of the tube and curved upright.

3. A method of passing a threadlike piece through a tubular product, comprising the steps of:

forming a coil of a tube having an inlet end;

feeding a threadlike piece through the inlet end of the tube at a feed speed;

vibrating the coil of the tube so that a given point of the tube reciprocates along a helical path for applying to said threadlike piece a force for causing the threadlike piece to move through said coil of the tube at a speed of conveyance attributable to the vibration of the coil; and controlling the feed speed of the threadlike piece by applying a force to the threadlike piece in the longitudinal direction thereof by a feeder acting on the threadlike piece at a position upstream of the inlet end of the tube, and adjusting the applied force for causing the feed speed at said inlet end of the tube to be at least slightly less than said speed of conveyance of the threadlike piece through the tube for reducing the undulations of the threadlike piece within the tube.

4. A method as claimed in claim 3 in which the feed speed of the threadlike piece is between 40% and 95% of said speed of conveyance.

* * * * *